United States Patent [19]

Angeli et al.

[11] Patent Number: 5,807,596
[45] Date of Patent: Sep. 15, 1998

[54] METHOD FOR MEASURING MOISTURE CONTENT ALONG A DRYING LINE

[75] Inventors: Alessandro Degli Angeli, Parma; Andrea Capovilla, Isera, both of Italy

[73] Assignee: M. G. Braibanti S.p.A., Milan, Italy

[21] Appl. No.: 656,870

[22] Filed: May 30, 1996

[30] Foreign Application Priority Data

Jun. 5, 1995 [IT] Italy ................................ MI95A1161

[51] Int. Cl.⁶ ..................................................... A23B 4/03
[52] U.S. Cl. .............................. 426/233; 34/483; 34/574; 73/73; 426/465
[58] Field of Search ..................................... 426/231, 233, 426/465; 73/73; 34/483, 574

[56] References Cited

FOREIGN PATENT DOCUMENTS

| | | | |
|---|---|---|---|
| 56-164945 | 12/1981 | Japan | 73/73 |
| 60-50435 | 3/1985 | Japan | 73/73 |

*Primary Examiner*—George Yeung
*Attorney, Agent, or Firm*—Oblon, Spivak, McClelland, Maier & Neustadt, P.C.

[57] ABSTRACT

A method for measuring moisture content along a drying line is described by the following stages: A first stage in which a predetermined (weight) quantity of product is withdrawn. A second stage in which, using a piece-counting system, the number of pieces forming the quantity of product withdrawn during the first stage is counted. A third stage in which the number of pieces of product is compared with predetermined values. The main advantage of this method its immediate response.

5 Claims, No Drawings

METHOD FOR MEASURING MOISTURE CONTENT ALONG A DRYING LINE

FIELD OF THE INVENTION

This invention relates to a method for measuring moisture content along a drying line.

DESCRIPTION OF THE RELATED ART

The methods used in the known art for measuring the moisture content of a product, such as short pasta (or pellets), comprises withdrawing product at different points along the drying line followed by analysis of the withdrawn product by various analytical procedures.

The response time of these analytical measurements is however rather long, especially when the product moisture content exceeds 15%.

It is clear that the lengthy time does not allow these methods to be used for continuously monitoring product moisture content along a drying line for short pasta, and enables only a historical result to be obtained.

The object of the present invention is therefore to overcome the drawbacks of the known art.

SUMMARY OF THE INVENTION

The present invention provides a method for measuring moisture content along a drying line, characterised by comprising:

a first stage in which a predetermined (weight) quantity of product is withdrawn;

a second stage in which using a piece-counting system the number of pieces forming the quantity of product withdrawn during the first stage is counted; and a third stage in which this number is compared with predetermined values.

This method is preferably used in short pasta drying lines or pellet plants.

The main advantage of the method of the present invention is its immediate response, enabling the product moisture content to be checked within a very short time and with only a narrow margin of error at each point in which the withdrawal is made.

The characteristics and advantages of the method of the present invention will be more apparent from the detailed description thereof given hereinafter by way of example.

The method of the present invention comprises a first stage in which a predetermined (weight) quantity of product is withdrawn by a mechanical handling system for loading and discharging the pieces and a balance of adequate accuracy.

This withdrawal stage can take place internally within the drying line, in a balanced atmosphere.

The predetermined (weight) quantity of product to be withdrawn is established on the basis of the dimensions of the format to be monitored.

There then follows the piece-counting second stage by the piece-counting system of the balance used in the withdrawal stage.

Finally a third stage takes place in which the number of pieces is associated with a tabulated predetermined moisture content for that number of pieces.

This method can be effected by a static system, at predetermined points of a drying line, at which it is necessary or opportune to monitor the moisture content, or it can be effected by a portable system available for example to inspectors, which could be positioned at system fixing points suitably provided and positioned during the assembly of the dryer.

The present invention also provides an apparatus for implementing the aforedescribed method, comprising:

a mechanical handling system for loading and discharging pieces and a balance of adequate precision for implementing the first stage of the method; and a piece-counting system for implementing the second stage of the method.

DESCRIPTION OF THE PREFERRED EMBODIMENTS

In one embodiment of the method according to the present invention, 1000 g of product (short pasta, pellets) are withdrawn at a selected point along the drying line. Using the piece-counting system it is found that this sample contains 500 pieces, for example of macaroni weighing 2 g each. With a classical analytical system it is found that the withdrawn product contains a water percentage of 30%.

Further withdrawals are then made at selected points of the drying process. These further withdrawals are always of a quantity of 1000 g of product.

For each of these withdrawals the piece-counting second stage is then applied. The number of pieces will have clearly increased as the water percentage contained in each piece has decreased. This water is hence replaced by a larger number of pasta pieces. With previous knowledge of the weight of the sample unit referred to a moisture content measured at the withdrawal point, the quantity of water evaporated and consequently the moisture content of the product under analysis can be determined by a suitable calculation.

Specifically, in this embodiment a series of withdrawals are made at predetermined points, enabling the results given in Table 1 to be obtained, indicating the number of macaroni pieces contained in 1000 g of sample withdrawn at each selected point of the process, and their corresponding moisture content.

TABLE 1

| NUMBER OF MACARONI (pieces) | CORRESPONDING MOISTURE CONTENT (%) |
|---|---|
| 500 | 33 |
| 507 | 32 |
| 515 | 31 |
| 522 | 30 |
| 530 | 29 |
| 537 | 28 |
| 545 | 27 |
| 552 | 26 |
| 559 | 25 |
| 567 | 24 |
| 574 | 23 |
| 582 | 22 |
| 589 | 21 |
| 597 | 20 |
| 604 | 19 |
| 612 | 18 |
| 619 | 17 |
| 627 | 16 |
| 634 | 15 |
| 641 | 14 |
| 649 | 13 |
| 657 | 12 |
| 664 | 11 |
| 671 | 10 |

From this table it can be seen that a variation of one unit of moisture content corresponds to about 7.5 pieces and hence a variation of one tenth of a unit of moisture content corresponds to 0.75 pieces. This means that, with a piececounter accuracy of ±2 pieces, the moisture content values fall within an acceptable range of accuracy similar to the accuracy of traditional analytical methods.

In this manner it is hence possible to obtain the predetermined values with which to compare the values obtained during the implementation of the method of the present invention.

This procedure can be integrated by a statistical support program which processes a moisture content curve based on the number of pieces checked and takes account for example of withdrawal errors, of the dimensions of the type of pasta chosen (for example macaroni), and of broken or defectively cut pieces.

This program can for example comprise different moisture content curves calibrated in relation to the type of format produced.

As already stated, the main advantage of the method of the present invention is its immediate response, which enables the moisture content of the product to be checked within a very short time and with a narrow margin of error, at each withdrawal point. It therefore prevents errors due to condensation or evaporation in ambient air.

A further advantage is that the sample does not have to be ground. Moreover the analysis is non-destructive and the sample on which it is effected can be returned to the drying line.

Furthermore the method of the present invention enables the moisture content to be measured at all points along the drying line which it is required to monitor, and hence enables the entire production to be continuously and quantitatively checked.

We claim:

1. A method for measuring moisture content of a product along a drying line, comprising:
   withdrawing a predetermined quantity of product from said drying line in a first stage;
   counting the number of pieces forming the quantity of product withdrawn during said first stage using a piece-counting system in a second stage; and
   determining a moisture content of said product by comparing said number with predetermined values in a third stage, said predetermined values being associated with a previously predetermined moisture content for the counted number of pieces.

2. A method as claimed in claim 1, wherein said withdrawal first stage is effected by a mechanical handling system for loading and discharging the pieces and a balance.

3. A method as claimed in claim 1, wherein said withdrawal first stage takes place internally within the drying line, in a balanced atmosphere.

4. A method as claimed in claim 1, wherein said predetermined quantity of product to be withdrawn is established by the size of said product.

5. The method as claimed in claim 1, wherein said drying line is a short pasta drying line or a pellet drying plant.

* * * * *